United States Patent
Batzer

(10) Patent No.: US 7,404,378 B2
(45) Date of Patent: Jul. 29, 2008

(54) PEARL CULTURE METHOD AND PRODUCT

(76) Inventor: William B. Batzer, Apt. 3305, 5556 New Territory Blvd., Sugar Land, TX (US) 77479

( * ) Notice: Subject to any disclaimer, the term of this patent is extended or adjusted under 35 U.S.C. 154(b) by 337 days.

(21) Appl. No.: 11/357,706

(22) Filed: Feb. 17, 2006

(65) Prior Publication Data

US 2007/0193526 A1 Aug. 23, 2007

(51) Int. Cl.
*A01K 61/00* (2006.01)

(52) U.S. Cl. ..................................... 119/244

(58) Field of Classification Search .............. 119/244, 119/234, 236
See application file for complete search history.

(56) References Cited

U.S. PATENT DOCUMENTS

| 988,889 | A | 4/1911 | Mikimoto |
|---|---|---|---|
| 1,176,090 | A | 3/1916 | Nishikawa |
| 1,328,008 | A | 1/1920 | Mikimoto |
| 1,353,932 | A | 9/1920 | Mise |
| 1,847,128 | A | 3/1932 | Mikimoto |
| RE18,700 | E | 12/1932 | Mikimoto |
| 2,126,024 | A | 8/1938 | Mikimoto |

(Continued)

FOREIGN PATENT DOCUMENTS

JP 52-075594 6/1977

(Continued)

OTHER PUBLICATIONS

Cahn, A. R., "Pearl Culture in Japan", Oct. 31, 1949, pp. 1-91, Natural Resources Section, General Headquarters, Supreme Commander for the Allied Powers, Tokyo, Japan.

(Continued)

*Primary Examiner*—Yvonne R. Abbott

(57) ABSTRACT

A method of culturing a pearl using a mollusk having mantle tissue that includes placing a first portion of a nucleus adjacent to the mantle tissue and allowing the mollusk to deposit nacre on this first portion of the nucleus; and repositioning the nucleus so a second portion of the nucleus is adjacent to the mantle tissue and allowing the mollusk to deposit nacre on this second portion of the nucleus. Also a cultured pearl produced by a method of placing a first portion of a nucleus adjacent to a mollusk's mantle tissue and allowing the mollusk to deposit nacre on this first portion of the nucleus; and repositioning the nucleus so a second portion of the nucleus is adjacent to the mantle tissue and allowing the mollusk to deposit nacre on this second portion of the nucleus. Further, a method of cultivating a pearl using one or more mollusks each having mantle tissue that includes placing a nucleus adjacent to the mantle tissue of one of the mollusks and sequentially reorienting the nucleus with respect to the mantle tissue of either this mollusk or one or more other mollusks.

20 Claims, 3 Drawing Sheets

U.S. PATENT DOCUMENTS

| | | | |
|---|---|---|---|
| 3,113,554 A | | 12/1963 | Kanai |
| 3,871,333 A | | 3/1975 | Gotoh |
| 4,954,340 A | * | 9/1990 | Maeda et al. ............ 424/278.1 |
| 5,347,951 A | | 9/1994 | Fankboner |
| 5,480,844 A | | 1/1996 | Matsui et al. |
| 5,749,319 A | | 5/1998 | Hirose |
| 6,341,580 B1 | | 1/2002 | Langdon |
| 6,514,614 B1 | | 2/2003 | Komatsu et al. |
| 7,163,795 B2 | * | 1/2007 | Chang et al. .................. 435/6 |
| 2004/0139920 A1 | * | 7/2004 | Carty et al. ................ 119/244 |

FOREIGN PATENT DOCUMENTS

| | | |
|---|---|---|
| JP | 63-071127 | 3/1988 |
| JP | 1-199529 | 8/1989 |
| JP | 3-272629 | 12/1991 |
| JP | 8-019349 | 1/1996 |
| JP | 9-327252 | 12/1997 |
| JP | 10-084806 | 4/1998 |

OTHER PUBLICATIONS

Farn, Alexander E., "Pearls: Natural, Cultured and Imitation", 1986, pp. 60-91, Butterworth-Heinemann Ltd., Oxford, United Kingdom.

Kunz, George F., et al., "The Book of the Pearl: Its History, Art, Science and Industry", republished 2001, pp. 285-298, Dover Publications, Inc., Mineola, New York.

Landman, Neil H., et al., "Pearls, A Natural History", 2001, pp. 153-183, Harry N. Abrams, Inc., New York.

Lintilhac, Jean-Paul, et al., "Black Pearls of Tahiti", 1987, pp. 45-82, Royal Tahitian Pearl Book, Papeete, Tahiti.

Ward, Fred, "The Pearl", National Geographic, Aug. 1985, pp. 193-223, National Geographic Society, Washington, D.C.

* cited by examiner ural freshwater pearl mussels by inserting objects through holes in the mussels' shells and holding the objects away from the shells using fine silver wire. The first commercially successful process for culturing free pearls was developed in Japan by Kokichi Mikimoto (using methods variously attributed to Otokichi Kuwabara, Tokichi Nishikawa and Tatsuhei Mise) beginning in the late 1800s. Mikimoto's technique involves making an incision in the organs of a pearl oyster, placing a nucleus within this incision, and placing a piece of mantle tissue against the nucleus that forms a sac that eventually covers the entire nucleus with nacre. This method is used to produce the majority of Japanese cultured pearls (sometimes referred to as Akoya pearls) as well as "South Sea" pearls that are being produced in Tahiti, Australia, and several other countries in the South Pacific. In terms of overall economic value, the Mikimoto method is used today to produce pearls that represent the largest part of the worldwide pearl market.

PEARL CULTURE METHOD AND PRODUCT

FIELD OF THE INVENTION

This invention relates to the production of cultured pearls and, more particularly, to an improved method for producing nucleated cultured pearls and pearls produced by this method.

BACKGROUND

Pearls are among the most esteemed gemstones and have been highly valued throughout recorded history. The relative scarcity of naturally forming pearls has lead many people to experiment with various methods for producing cultured pearls. The Chinese appear to have developed the first commercially successful cultured pearl production method, perhaps beginning in as early as the fifth century. They inserted various objects between the shell and mantle tissue of freshwater pearl mussels, returned them to the water, and recovered the mussels a year or more later to find the inserted objects coated with mother-of-pearl, which is also referred to as nacre. Similar methods are still being used today to produce what are alternatively known as Mabe, Chicot, or half pearls using various types of mollusks such as freshwater mussels, saltwater oysters, and abalone.

In the mid-1700s, a Swedish naturalist, Carl Linne, induced the formation of free pearls in European freshwater pearl mussels by inserting objects through holes in the mussels' shells and holding the objects away from the shells using fine silver wire. The first commercially successful process for culturing free pearls was developed in Japan by Kokichi Mikimoto (using methods variously attributed to Otokichi Kuwabara, Tokichi Nishikawa and Tatsuhei Mise) beginning in the late 1800s. Mikimoto's technique involves making an incision in the organs of a pearl oyster, placing a nucleus within this incision, and placing a piece of mantle tissue against the nucleus that forms a sac that eventually covers the entire nucleus with nacre. This method is used to produce the majority of Japanese cultured pearls (sometimes referred to as Akoya pearls) as well as "South Sea" pearls that are being produced in Tahiti, Australia, and several other countries in the South Pacific. In terms of overall economic value, the Mikimoto method is used today to produce pearls that represent the largest part of the worldwide pearl market.

An alternative non-nucleated pearl culturing method has also been developed that involves inserting several pieces of mantle tissue into incisions in the mantle organ of a freshwater mussel. This method is primarily being used in China. In terms of total weight of pearls produced, this type of method accounts for a large fraction of worldwide pearl production, although in economic terms it remains a distant second to pearls produced by the Mikimoto method discussed above.

Significant problems or limitations exist with each of these methods of pearl production. Only approximately one half of the outer surface of Mabe pearls are covered by nacre, making them suitable for only certain types of jewelry, such as earrings or pendants. Mabe pearls represent a very small fraction of the pearl jewelry market.

Current nucleated pearl production methods are quite difficult and laborious, technically and practically. Learning where and how to appropriately make the incision into the oyster's organs, insert the nucleus, and insert the piece of mantle tissue next to the nucleus requires substantial training. It has been estimated that it often takes several hundred supervised attempts at seeding pearl oysters before a trainee begins to be competent at the pearl seeding process. This process is also quite traumatic on the pearl oyster and even when a skilled technician is used, "vomits" (where the pearl oyster "spits out" the nucleus soon after insertion) and "deaths" (where the pearl oyster dies soon after insertion) can often exceed 50% of the implanted oysters. Because the nucleus insertion process is very delicate and difficult, there is a worldwide shortage of skilled oyster nucleating technicians and these technicians are often able to demand to be paid a high fraction of the pearls that are eventually produced as a result of their seeding efforts.

Even if the pearl oyster survives the insertion process and retains the nucleus, the quality of the pearl produced will not be known until the pearl oyster is harvested and opened, typically between a year and a half and three years after the nucleus has been inserted. Only a relatively small percentage of the pearls produced will be of the highest quality. The portion of the harvest that is round or semi-round, with fine to good luster, and nacre surface with few or no blemishes will be designated as "A" or "B" grade. These pearls usually comprise between only 2% and 10% of a crop, but may represent between 30% and 50% of the overall value of the harvest. It is common, for instance, for some pearls to be irregularly shaped (a large number of Tahitian pearls, for instance, have a distinctive shape called "circles" where the pearls are surrounded by dark latitudinal striations), suffer from significant surface imperfections, etc. The size and shape of the pearl that will be eventually be produced will depend on the type of mollusk used, the size and shape of the nucleus (nuclei are typically almost perfectly spherical), the size, shape and placement of the incision made by the technician, the positioning of the piece of mantle tissue inserted with the nucleus, and the growth time and final nacre thickness. While they are sometimes produced accidentally, the Mikimoto method is not conducive to intentionally producing fancy shaped pearls, such as teardrop or pear shaped pearls.

While some failures in the nucleation process may be detected within the first several days or few weeks (because the oyster dies or the nucleus is rejected), the success of the majority of the other nucleation attempts will not be known until the oyster is eventually harvested. Only after the oyster has been cared for during the typically one and a half to three year nucleation period will it be known whether the implantation process was successful or not. Thus while the relatively few pearls produced by this method that are perfect or nearly perfect are often extremely beautiful and valuable, the method currently being used to produce nucleated cultured pearls leaves a great deal to be desired.

Pearls produced using the non-nucleated method discussed above are typically irregularly shaped and are almost always far less attractive (in terms of size, shape, color, and nacre quality) and far less valuable than nucleated pearls.

For these reasons, it would be of great benefit to be able to produce nucleated cultured pearls using a method that do not suffer from one or more of the problems described above or that offers one or more of the benefits described below.

SUMMARY OF INVENTION

One aspect of the invention involves a method of culturing a pearl using a mollusk having mantle tissue, the method comprising placing a first portion of a nucleus adjacent to the mantle tissue and allowing the mollusk to deposit nacre on this first portion of the nucleus; and repositioning the nucleus so a second portion of the nucleus is adjacent to the mantle tissue and allowing the mollusk to deposit nacre on this second portion of the nucleus.

Another aspect of the invention involves a cultured pearl produced by a method of placing a first portion of a nucleus adjacent to a mollusk's mantle tissue and allowing the mollusk to deposit nacre on this first portion of the nucleus; and repositioning the nucleus so a second portion of the nucleus is adjacent to the mantle tissue and allowing the mollusk to deposit nacre on this second portion of the nucleus.

A further aspect of the invention involves a method of cultivating a pearl using one or more mollusks each having mantle tissue, the method comprising placing a nucleus adjacent to the mantle tissue of one of the mollusks and sequentially reorienting the nucleus with respect to either the mantle tissue of this mollusk or the mantle tissue of one or more other mollusks.

Further details and features of the invention will become more readily apparent from the detailed description that follows.

BRIEF DESCRIPTION OF FIGURES

The invention will be described in more detail below in conjunction with the following Figures in which.

DETAILED DESCRIPTION

Figure 1:
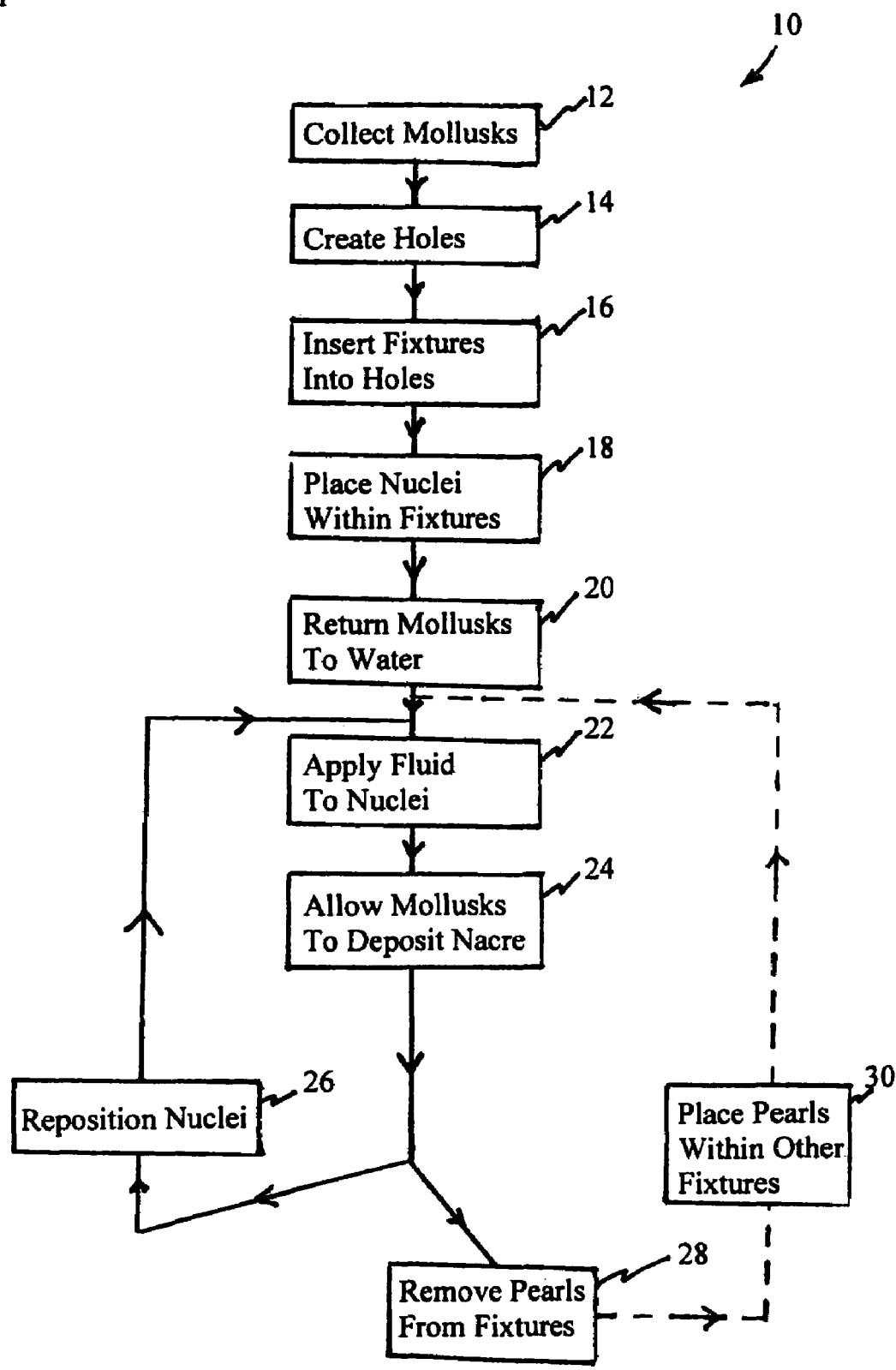
FIG. 1 is a flowchart depicting various processes associated with embodiments of the present invention.

FIG. 1 is a flowchart that depicts various processes associated with embodiments of the present invention. Inventive Process 10 typically begins with Collect Mollusks 12, which involves collecting mollusks to begin the pearl culturing process. Suitable freshwater mollusks for carrying out the present invention include but are not limited to Freshwater Pearl Mussels (family Unionidae, genus *Hyriopsis, Cristaria, Margaritifera*, etc.), particularly Tampico Pearlymussel (*Cyrtonaias tampicoensis*); Yellow Sandshell (*Lampsilis teres*); and Pink Lady-Finger (*Elliptio dilatatus*). Suitable saltwater mollusks for carrying out the present invention include but are not limited to: Pearl Oysters (genus *Pinctada* and *Pteria*); Abalone (genus *Haliotis*); and Conchs (genus *Strombus*). Suitable mollusks for pearl culture often have lustrous nacre on the inner surface of the mollusk's shell and may have a variety of colors such as white, silver, grey, black, salmon, or purple. Some types of suitable pearl forming mollusks, such as conchs, are however non-nacreous.

This process is followed by Create Holes 14, where holes in the shells of the mollusks are created, such as by using a diamond coring drill to drill holes that pass through the shells of the mollusks. The holes may be less than 10 millimeters in diameter or more than 30 millimeters in diameter, but will typically be between about 15 and about 25 millimeters in diameter. It is important that as few drill cuttings as possible enter the interior of the mollusks and it is also preferable that the mantle tissue be traumatized as little as possible during this process. This can be accomplished, for instance, by often flushing away the drill cuttings as the hole is being drilled, stopping drilling as soon as extrapallatial fluid begins to enter the area drilled, firmly grasping the shell plug created by the coring drill (typically using a hand tool, such as forceps), gently detaching the shell plug from the remainder of the shell, and slowly and gradually removing the shell plug to create the hole through the mollusk shell. It may also be helpful to slide an object (such as a spatula) along the inner surface of the mussel's shell to protect the portion of the mantle tissue where the drill bit will enter the inner surface of the shell. It is helpful to keep this process as antiseptic as possible and to avoid transferring bacteria or other pathogens from one mollusk to another. It will be understood that other methods and equipment are known to those skilled in the art that can alternatively be used to create one or more such holes (of cylindrical or alternative shape) in mollusk shells.

A fixture may then be placed within the hole. This process is shown in FIG. 1 as Insert Fixtures Into Holes 16. These fixtures may have recesses that are shaped to receive a pearl nucleus and can also serve to isolate one portion of the nucleus that is adjacent to the mantle tissue of the mussel from other portions of the nucleus.

Nuclei are placed within the fixture recesses in Place Nuclei Within Fixtures 18. The nuclei will typically be fabricated from freshwater pearl mussel shell (as used in conventional nucleated pearl culture), although suitable alternative nuclei materials are known to those skilled in the art and may also be used. If the nuclei are spherically shaped, they will typically be between approximately 6 millimeters and 15 millimeters in diameter but could be 20 millimeters or larger. Teardrop or pear shaped nuclei may have a length between 6 millimeters and 20 millimeters but could be 30 millimeters or larger. When a nucleus is placed within the fixture, a first portion of the nucleus will typically be located adjacent to the mollusk's mantle tissue.

The mollusks are generally returned to the water at this point and this is shown in FIG. 1 as Return Mollusks To Water 20. It may also be helpful to connect the fixture to a tube to the surface or to seal off the external part of the fixture and submerge the mollusk to a sufficient depth so that the differential force between the hydrostatic pressure inside the mollusk and the atmospheric pressure inside the fixture helps to push out any air bubbles, mantle tissue sag, or pockets of extrapallatial fluid that may have formed when the holes were drilled, the fixtures were placed within the holes, or when the nuclei were placed within the fixtures.

Fluid may be applied to the nuclei and this is shown in FIG. 1 as Apply Fluid to Nuclei 22. This fluid can help lubricate the nucleus to allow it to be more easily repositioned and can help to prevent bacteria or organic material from the extrapallatial fluid from building up on portions of the nuclei that are not adjacent to the mussel tissue. Often this fluid will comprise between 99 and 100 weight percent water and may particularly comprise a buffered saline solution containing sodium, potassium, calcium, and chlorine ions. One type of buffered saline solution that may be used is Chemin's Balanced Salt Solution that has the following constituents:

| Substance | Concentration (gm/1000 ml of bidistilled water) |
| --- | --- |
| NaCl | 2.80 |
| KCl | 0.15 |
| $Na_2HPO_4$ (anh) | 0.07 |
| $CaCl_2 \cdot 2H_2O$ | 0.53 |
| $MgSO_4 \cdot 7H_2O$ | 0.45 |
| $NaCHO_3$ | 0.05 |
| pH | between 7.3 and 7.5 |

This solution may be sterilized by filtration through a millipore membrane filter and may include an indicator, such as 0.4% phenol red, 5 ml/1000 ml of salt solution, to monitor variations in pH during storage and use.

Fluid is typically applied to a portion of the nucleus that is not adjacent to the mantle tissue and can be applied by misting the nucleus with fluid, applying one or more drops of fluid to the nucleus, filling the internal portion of the fixture with fluid, etc. This fluid application process may be periodically repeated as the mollusk is allowed to deposit nacre on the portion of the nucleus that is adjacent to the mollusk's mantle tissue. This is shown in FIG. 1 as Allow Mollusks To Deposit Nacre 24.

Typically, after waiting a period of time, the nucleus is repositioned. This is shown in FIG. 1 as Reposition Nuclei 26. The nucleus may be repositioned, for instance, by moving an object attached to the nucleus. This may involve grasping the nucleus with a tool and moving the tool with respect to the mollusk's shell. Because the nucleus is very smooth and will often be very slippery and difficult to grasp, it may be preferable to grasp the nucleus by suctioning the nucleus into firm contact with a cup attached to a handpiece. Because the available space within the fixture is typically quite limited, it is preferable to use a tool that allows one-handed operation, such as a handpiece having an attached vacuum hose, an index finger operated valve that allows suction to be directed to a cup at the end of the handpiece and allows the nucleus to be grasped by the tool, and a thumb operated spring loaded plunger that can be used to physically eject the nucleus from the cup after it has been repositioned.

The nucleus may be repositioned using a particular predetermined pattern (allowing the mollusk to deposit nacre for one month on one side of the nucleus, allowing the mollusk to deposit nacre for another month on the opposite side of the nucleus, allowing the mollusk to deposit nacre for 2 weeks on a portion of the nucleus that is between these opposing sides, etc.). An alternative procedure is to visually observe or measure the quality and thickness of the nacre deposited on the nucleus and then place, for instance, the portion of the nucleus where the nacre is the thinnest or where additional nacre is required to cover a surface imperfection or blemish on the nucleus' external surface.

An alternative method for repositioning the nucleus is to use an object, such as a wire, that remains attached to the nucleus for a substantial period of time, which may be from several days to many months or even several years. Twisting the wire, for instance, can cause rotation of the nucleus as discussed in more detail below.

An alternative method for repositioning the nucleus involves repositioning the mollusk with respect to an externally applied field (such as a magnetic field or the earth's gravitational field) or by repositioning an externally applied field with respect to said mollusk (such as a magnetic field). Those skilled in the art will realize that use of this process may involve ensuring that the nucleus (at least temporarily) includes or is attached to one or more objects with a magnetic dipole or in which the center of gravity of the nucleus and any attached objects is not located on the nucleus's axis of rotation.

After repeatedly repositioning the nucleus and allowing the mollusk to deposit nacre on different portions of the nucleus, the nucleus may then be partially, substantially, or entirely covered by nacre. At this point, the nacre-covered nucleus is more accurately referred to as a pearl and it may be removed from the fixture. This is shown in FIG. 1 as Remove Pearls From Fixtures 28.

This pearl can also be used as a nucleus and placed within a fixture inserted within another mollusk. This is shown in FIG. 1 as Place Pearls Within Other Fixtures 30. The processes of Apply Fluid To Nucleus 22, Allow Mollusks To Deposit Nacre 24, and Reposition Nuclei 26, as discussed above, may then be repeated. In this way, it is possible for different concentric layers of nacre from different mollusks to be deposited around a single nucleus. These different layers may have different colors, different degrees of pearliness or iridescence, etc. It is also possible to use this pearl as a nucleus in a conventional Mikimoto type of nucleated pearl culturing process.

Many thick-shelled freshwater mussels may live for 20 to 40 years, or more, and one significant advantage of the inventive method is that it allows a single mollusk to deposit nacre on multiple nuclei, thereby allowing a single mussel to potentially produce several pearls during its lifetime.

Figure 2:
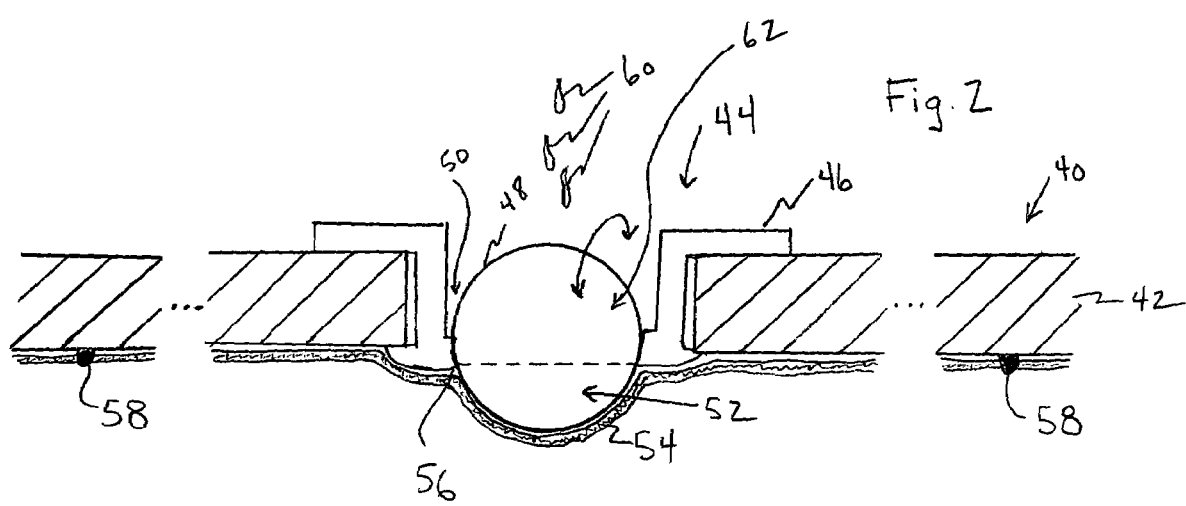
FIG. 2 is a cross sectional view of a portion of a mollusk after a hole has been created, a fixture has been inserted, and a spherical nucleus has been placed within the fixture.

A cross sectional view of a mollusk 40 is shown in FIG. 2. In FIG. 2, the mollusk's shell 42 has had a hole 44 drilled through it. A fixture 46 has been placed within hole 44 and a spherical pearl nucleus 48 has been placed within a recessed portion 50 of the fixture.

A hole drilled in a mollusk shell will never be perfectly round and will never be drill precisely perpendicular to the interior surface of the mollusk's shell. It is important that the water in which the mollusk lives be effectively isolated from the extrapallatial fluid inside the mollusk. The introduction of water into the extrapallatial fluid will disrupt the normal formation of nacre by the mollusk. If significant quantities of water are able to leak around the edge of the fixture 46 and into the extrapallatial fluid, the mollusk will be unable to maintain a proper chemical balance in the extrapallatial fluid and this will cause the mollusk to die.

For these reasons, fixture 46 may have a larger outer portion external to the shell and a retaining portion that rests against the inner periphery of the hole 44 and prevents extrapallatial fluid from entering any gap between the shell and the fixture. The portion of the fixture 46 between the outer portion and the retaining portion may be fabricated from an elastomeric material, such as silicone, to allow a tight fit to be obtained between the retaining portion and the inner edge of the hole 44, despite small variations in the hole's dimensions, shell thickness, and hole orientation with respect to the inner surface of shell 42. Fabricating this portion of the fixture from an elastomeric material that is allowed to flex from side to side and stretch and dimensioning the length of this portion of the fixture to be slightly less than the expected or measured (typically circumferentially nonuniform) shell thickness can assure a snug fit between the fixture and the shell and assure adequate isolation between the extrapallatial fluid and the surrounding waters. The diameter of this portion of the fixture can optionally be made as large as or slightly larger than the expected diameter of the hole to provide a further barrier to fluid movement between the interior and exterior surfaces of the shell. A first portion of the nucleus 52 is typically positioned adjacent to the mollusk's mantle tissue 54. A thin film of extrapallatial fluid 56 will typically separate the nucleus 52 and the mantle tissue 54.

When undertaking the method (with freshwater mussels particularly), hole 42 will preferably be drilled entirely interior to the pallial line, where a muscular band 58 attaches the mantle organ to the mollusk's shell 42. This attachment forms a barrier that helps prevent foreign matter from getting in between the mantle and shell. Pin head pearls, blisters, and other marks are much more frequent on the area between the pallial line and the edge of the shell than inside this area of attachment, showing that the muscular band 58 forms a very effective barrier to mud as well as to some parasites. Creating hole 42 so that it is entirely interior to the pallial line allows the mollusk's extrapallatial fluid 56 to more quickly reach chemical equilibrium and helps prevents the loss or contamination of extrapallatial fluid as a pearl is being cultured.

Fluid 60 will typically be applied to a portion of the nucleus 62 that is not adjacent to the mollusk's mantle tissue. It may be beneficial to periodically remove any excess fluid that collects within the recessed portion 50 of fixture 46. As noted above, the nucleus may be repositioned by grasping the nucleus with a tool and moving the tool or by changing the relative position of the shell 42 with respect to an externally applied field.

Figure 3:
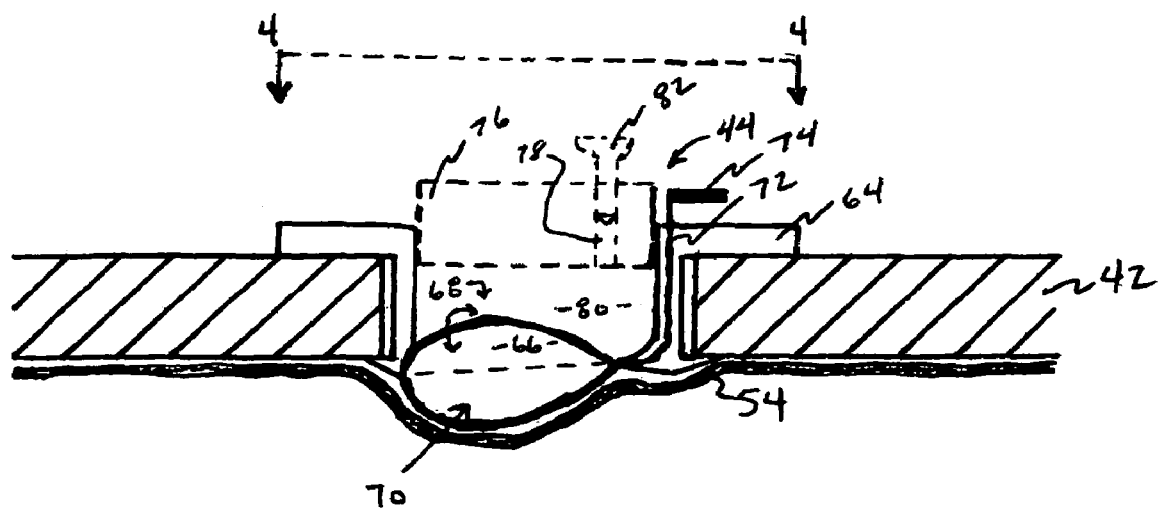
FIG. 3 is a cross sectional view of a different embodiment of the present invention, where the nucleus is teardrop shaped and may be repositioned by twisting an attached wire.

An alternative embodiment of the inventive method is shown in FIG. 3. In FIG. 3, the mollusk's shell 42 again has a hole 44 drilled through it. A different type of fixture 64 has been placed within hole 44 and a teardrop shaped pearl nucleus 66 has been placed within a recessed portion 68 of the fixture. A pear shaped nucleus can alternatively be used. A first portion 70 of nucleus 66 is again positioned adjacent to the mollusk's mantle tissue 54. Attached to nucleus 66 is a wire 72 that, in this embodiment, rests within a groove formed in fixture 64. At the other end of wire 72 is handle 74. In this embodiment, the nucleus may be repositioned by twisting handle 74, which causes nucleus 66 to rotate within fixture 64.

Fixture 64 may optionally have a cover 76 that can be press fit, threaded, glued, locked, etc. to the fixture. Space 80 can include fluid, as discussed above, and filler such as spun fiberglass can be used to pack space 80. Bleed hole 78 can allow air to escape from space 80 after cover 76 is put into place and this hole may be sealed shut, for instance, by screw 82. Cover 76, bleed hole 78, screw 82, and the filler material may also be used with the embodiment shown in FIG. 2 and can provide pressure to help keep nucleus 62 tightly seated against fixture 46 even when the assembly is upside down (i.e. when gravitational forces would tend to pull the nucleus away from the fixture) or when the mollusk uses its foot muscle to push against and attempt to dislodge the nucleus.

Figure 4:
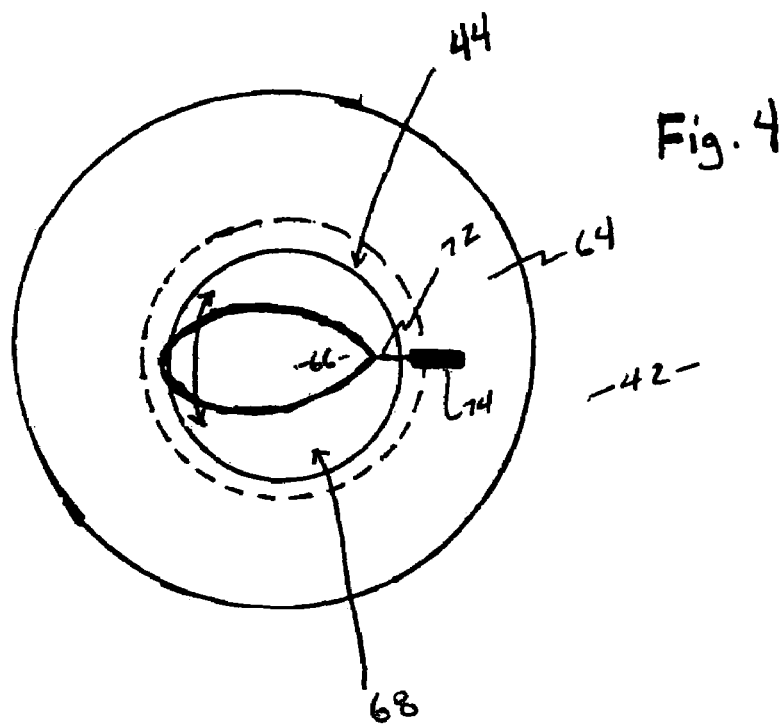
FIG. 4 is a plan view of the embodiment shown in FIG. 3.

FIG. 4 shows a plan view of the alternative embodiment shown in FIG. 3, in this case without cover 76. Again in FIG. 4, mollusk's shell 42 has hole 44 drilled through it. Fixture 64 has been placed within hole 44 and a teardrop shaped pearl nucleus 66 has been placed within recessed portion 68 of the fixture. Attached to nucleus 66 is a wire 72 that rests within a groove formed in fixture 64. At the opposite end of the wire 72 is handle 74. Rotating handle 74 in either the clockwise or counterclockwise direction will cause nucleus 66 to correspondingly rotate within fixture 64.

The nacre deposited by a mollusk consists of hundreds of thin sheets of hexagonal nacreous crystals. Each sheet is extremely thin, perhaps 250-300 nanometers in thickness. In one type of pearl oyster, it is estimated that during cultivation, one to seven sheets of nacre are deposited on a pearl nucleus per day. These layers are also not absolutely continuous around the entire pearl, but are deposited in a series of layers that overlap one another like slates on a roof. It may be preferable to regularly (perhaps as often as daily, hourly, or even continuously) reposition the nucleus and it may be preferable to reposition the nucleus in such a direction that the "lowest" sheets are withdrawn first from their positions adjacent to the mantle tissue.

In temperate climates, the secretion of nacre slows in the winter, during which time the nacreous tables are more perfectly formed. The transition to summer growth is marked by more rapid secretion, resulting in less even tablet formation. The inventive method can effectively utilize this difference by having much of the nacre nearest to the nucleus deposited by a mollusk or mollusks located in warmer climates and then transporting the nuclei to a cooler area and having one or more other mollusks deposit better quality nacre on the final outermost surface of the pearl.

It is also possible to implement the inventive method by switching mollusks each time the nucleus is repositioned (i.e. instead of repeatedly repositioning the nucleus with respect to a single mollusk, it would also be possible to remove the nucleus each time it needs to be repositioned and placing this nucleus adjacent to the mantle tissue of another mollusk). Therefore, another way to describe or characterize the inventive method is as a method of cultivating a pearl using one or more mollusks that involves placing a nucleus adjacent to the mantle tissue of one of the mollusks and then sequentially reorienting the nucleus with respect to either the mantle tissue of this mollusk or the mantle tissue of one or more other mollusks until the nucleus is covered in nacre.

Applicant has described the inventive methods and product by process entirely prophetically and is not necessarily claiming or asserting that all of the processes and products described herein have been carried out, undertaken, or produced prior to the filing date of this patent application.

While the invention has been described herein with reference to certain examples and embodiments, it will be evident that various modifications and changes may be made to the embodiments described above without departing from the scope and spirit of the invention as set forth in the claims. It would be possible, for instance, to utilize a fixture where a portion of the fixture (or the entire fixture, for that matter) may be repositioned with the nucleus or moved with the nucleus from mollusk to mollusk. Other alternative fixture designs could also be utilized. It may be desirable, for instance, to utilize a fixture that places the nucleus deeper into the mollusk or where the inner surface of the mollusk's shell, the innermost surface of the fixture, and the portion of the nucleus that is adjacent to the mantle tissue provides as smooth a surface as possible, to promote the production of nacre and to avoid promoting the depositing of conchiolin on the nucleus by the mantle tissue.

I claim:

1. A method of culturing a pearl using a mollusk having mantle tissue, said method comprising:
   placing a first portion of a nucleus adjacent to said mantle tissue and allowing said mollusk to deposit nacre on said first portion of said nucleus; and
   repositioning said nucleus so a second portion of said nucleus is adjacent to said mantle tissue and allowing said mollusk to deposit nacre on said second portion of said nucleus.

2. A method of culturing a pearl in accordance with claim 1, further comprising repeatedly repositioning said nucleus and allowing said mollusk to deposit nacre on other portions of said nucleus until said nucleus is substantially covered by nacre.

3. A method of culturing a pearl in accordance with claim 1, further comprising removing a part of a shell of said mollusk to create a hole through said shell and placing said nucleus within said hole.

4. A method of culturing a pearl in accordance with claim 3, wherein said hole is created by drilling through said shell using a coring bit.

5. A method of culturing a pearl in accordance with claim 3, further comprising placing a fixture within said hole, said fixture having a recess shaped to receive said nucleus and isolating one portion of said nucleus that is adjacent to said mantle tissue from other parts of said nucleus.

6. A method of culturing a pearl in accordance with claim 1, further comprising applying a fluid to a portion of said nucleus.

7. A method of culturing a pearl in accordance with claim 6, wherein said fluid comprises between 99 and 100 percent water by weight.

8. A method of culturing a pearl in accordance with claim 6, wherein said fluid comprises a buffered saline solution containing sodium, potassium, calcium, and chlorine ions.

9. A method of culturing a pearl in accordance with claim 6, wherein said fluid is applied to a portion of said nucleus that is not adjacent to said mantle tissue.

10. A method of culturing a pearl in accordance with claim 1, wherein said nucleus is repositioned by moving an object attached to said nucleus.

11. A method of culturing a pearl in accordance with claim 10, wherein said object remains attached to said nucleus for several days after said nucleus has been repositioned.

12. A method of culturing a pearl in accordance with claim 10, wherein said nucleus is repositioned by grasping said nucleus with a tool and moving said tool.

13. A method of culturing a pearl in accordance with claim 12, wherein said tool grasps said nucleus through the use of suction.

14. A method of culturing a pearl in accordance with claim 1, wherein said mollusk is a fresh-water mussel.

15. A method of culturing a pearl in accordance with claim 1, wherein said nucleus is significantly non-spherical.

16. A method of culturing a pearl in accordance with claim 15, wherein such nucleus is teardrop or pear shaped.

17. A method of culturing a pearl in accordance with claim 1, further including placing a portion of said nucleus adjacent to mantle tissue of a second mollusk and allowing said second mollusk to deposit nacre on said portion of said nucleus.

18. A cultured pearl produced by the method of:
placing a first portion of a nucleus adjacent to a mollusk's mantle tissue and allowing said mollusk to deposit nacre on said first portion of said nucleus; and
repositioning said nucleus so a second portion of said nucleus is adjacent to said mantle tissue and allowing said mollusk to deposit nacre on said second portion of said nucleus.

19. A method of cultivating a pearl using one or more mollusks each having mantle tissue, said method comprising:
placing a nucleus adjacent to the mantle tissue of one of said mollusks; and
sequentially reorienting said nucleus with respect to the mantle tissue of either this mollusk or one or more other mollusks.

20. A method of culturing a pearl in accordance with claim 19, wherein said sequentially reorienting process is repeated until said nucleus is substantially covered by nacre.

* * * * *